US008973279B2

(12) United States Patent
Singh et al.

(10) Patent No.: US 8,973,279 B2
(45) Date of Patent: Mar. 10, 2015

(54) COORDINATE MEASURING MACHINE WITH SUPPORT BEAM HAVING SPRINGS

(71) Applicant: Hexagon Metrology, Inc., North Kingstown, RI (US)

(72) Inventors: Gurpreet Singh, Providence, RI (US); John Langlais, Coventry, RI (US); Jie Zheng, Mansfield, MA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 190 days.

(21) Appl. No.: 13/782,594

(22) Filed: Mar. 1, 2013

(65) Prior Publication Data

US 2013/0227850 A1 Sep. 5, 2013

Related U.S. Application Data

(60) Provisional application No. 61/605,831, filed on Mar. 2, 2012, provisional application No. 61/605,829, filed on Mar. 2, 2012.

(51) Int. Cl.
*G01B 5/008* (2006.01)
*G01B 21/04* (2006.01)
*G01B 5/00* (2006.01)

(52) U.S. Cl.
CPC .............. *G01B 5/008* (2013.01); *G01B 21/042* (2013.01); *G01B 5/0014* (2013.01)
USPC ............................................... 33/503; 33/502

(58) Field of Classification Search
CPC ..... G01B 5/008; G01B 5/0014; G01B 21/042
USPC .......................................... 33/502, 503, 556
See application file for complete search history.

(56) References Cited

U.S. PATENT DOCUMENTS

| 4,138,822 A | 2/1979 | Parodi ........................... 33/174 P |
| 4,819,195 A | 4/1989 | Bell et al. .................. 364/571.05 |
| 5,173,613 A | 12/1992 | Henry et al. .................. 250/560 |
| 5,287,629 A | 2/1994 | Pettersson ....................... 33/503 |

(Continued)

FOREIGN PATENT DOCUMENTS

EP 0523023 A1 1/1993 ............... G01B 5/00

OTHER PUBLICATIONS

International Searching Authority, International Search Report—International Application No. PCT/US2013/028649, dated Aug. 9, 2013, together with the Written Opinion of the International Searching Authority, 15 pages.

(Continued)

*Primary Examiner* — G. Bradley Bennett
(74) *Attorney, Agent, or Firm* — Sunstein Kann Murphy & Timbers LLP

(57) ABSTRACT

A coordinate measuring machine has 1) an anchor beam with a top end and a bottom end, 2) at least one support beam having a top end and a bottom end, and 3) a cross-beam supported on the top ends of both the anchor beam and the at least one support beam. In addition, the coordinate measuring machine also has 4) a base supporting the bottom ends of the anchor beam and the at least one support beam. At least one of the at least one support beams has a first spring and a second spring. In preferred embodiments, the first spring is adapted to allow movement and is spaced from the second spring in a direction that is generally parallel with the longitudinal axis of the cross-beam.

22 Claims, 13 Drawing Sheets

(56) References Cited

U.S. PATENT DOCUMENTS

| | | | |
|---|---|---|---|
| 5,291,662 A * | 3/1994 | Matsumiya et al. | 33/503 |
| 5,594,668 A | 1/1997 | Bernhardt et al. | 364/571.07 |
| 6,158,136 A * | 12/2000 | Gotz et al. | 33/503 |
| 6,161,298 A | 12/2000 | Bernhardt et al. | 33/702 |
| 6,202,316 B1 | 3/2001 | Swift et al. | 33/503 |
| 6,591,208 B2 * | 7/2003 | Lotze et al. | 702/95 |
| 6,615,102 B1 | 9/2003 | Morfino | 700/173 |
| 6,748,790 B2 | 6/2004 | Abbe | 73/1.79 |
| 6,854,193 B2 | 2/2005 | Lotze | 33/505 |
| 6,868,356 B2 | 3/2005 | Nai et al. | 702/95 |
| 7,222,434 B2 * | 5/2007 | Kikuchi | 33/503 |
| 7,752,766 B2 * | 7/2010 | Ruck et al. | 33/503 |
| 7,905,027 B2 | 3/2011 | MacManus | 33/502 |
| 8,290,733 B2 | 10/2012 | Pettersson | 702/95 |
| 2010/0319207 A1 * | 12/2010 | Held | 33/503 |
| 2012/0017453 A1 * | 1/2012 | Ogihara et al. | 33/503 |
| 2012/0084989 A1 | 4/2012 | Pettersson et al. | 33/503 |
| 2013/0227850 A1 * | 9/2013 | Singh et al. | 33/502 |
| 2014/0007441 A1 * | 1/2014 | Pettersson et al. | 33/503 |
| 2014/0222372 A1 * | 8/2014 | Sprenger | 33/503 |
| 2014/0259715 A1 * | 9/2014 | Engel | 33/503 |

OTHER PUBLICATIONS

Gipple et al., "Measurement of the Out-of-Plane Shear Response of Thick Section Composite Materials Using the V-notched Beam Specimen," *Carderock Division—Naval Surface Warfare Center*, CRDKNSWC-SSM-64-92/22, 45 pages, May 24, 1993.

European Patent Office, Officer C. Choulouilidou, Invitation to Pay Additional Fees and, Where Applicable, Protest Fee (Annex Partial International Search Report), application No. PCT/US2013/028649, date of mailing Jun. 7, 2013, 6 pages.

\* cited by examiner

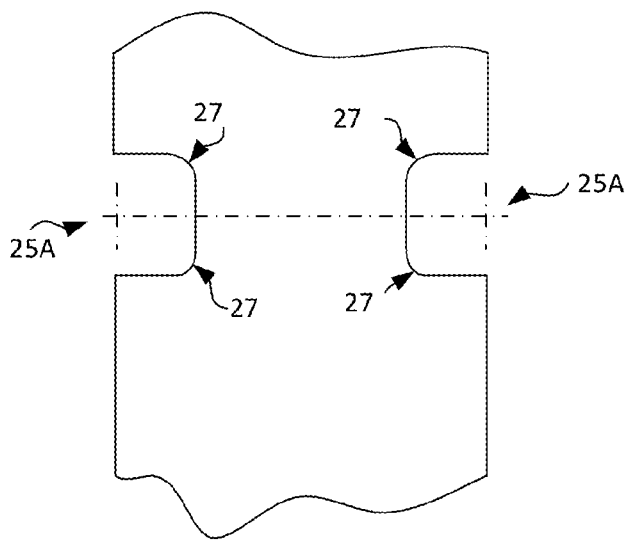 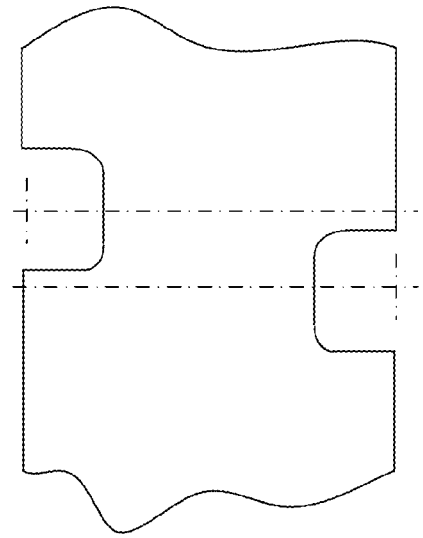
Fig. 6C  Fig. 6D
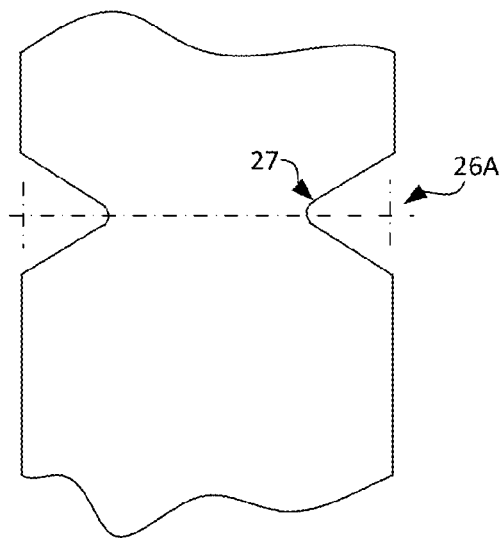
Fig. 6E

COORDINATE MEASURING MACHINE WITH SUPPORT BEAM HAVING SPRINGS

PRIORITY

The present application claims priority from Provisional Application No. 61/605,831, titled "Coordinate Measuring Machine with Support Beam Having Springs" and filed Mar. 2, 2012, and from Provisional Application No. 61/605,829, titled "Coordinate Measuring Machine with Constrained Counterweight" and filed Mar. 2, 2012. These applications are incorporated by reference herein in their entirety.

FIELD OF THE INVENTION

The invention generally relates to coordinate measuring machines and, more particularly, the invention relates to improving the accuracy of coordinate measuring machines.

BACKGROUND OF THE INVENTION

Among other things, coordinate measuring machines ("CMMs," also known as surface scanning measuring machines) measure geometry and surface profiles, or verify the topography of known surfaces. For example, a CMM may measure the topological profile of a propeller to ensure that its surface is appropriately sized and shaped for its specified task (e.g., moving a 24-foot boat at pre-specified speeds through salt water).

To that end, conventional CMMs typically have a base directly connected with and supporting a movable assembly having a probe that directly contacts and moves along a surface of an object being measured. The base may also support the object being measured. Commonly, the base is formed from a material having a coefficient of thermal expansion that is different from that of the portion of the movable assembly it directly contacts. This disparity can cause the base to move relative to the assembly by microns, or even millimeters. With a change in the ambient thermal environment, this mismatch can significantly distort the geometry of the machine and skew the results of the measurement, particularly when measuring to the micron level.

SUMMARY OF VARIOUS EMBODIMENTS OF THE INVENTION

In accordance with one embodiment of the invention, a coordinate measuring machine has 1) an anchor beam with a top end and a bottom end, 2) at least one support beam having a top end and a bottom end, and 3) a cross-beam supported on the top ends of both the anchor beam and the at least one support beam. In addition, the coordinate measuring machine also has 4) a base supporting the bottom ends of the anchor beam and the at least one support beam. At least one of the at least one support beams has a first spring and a second spring. In preferred embodiments, the first spring is spaced from the second spring in a direction that is generally parallel with the longitudinal axis of the cross-beam. In a preferred embodiment, the springs are adapted to allow movements in a direction that is generally parallel with the longitudinal axis of the cross-beam.

A number of different types of springs should suffice to compensate for thermal expansion issues. Among other things, the springs may be integral to the at least one support beam. For example, the springs may form a lazy-S shape. As another example, the two springs may, in conjunction, form a pantograph. The cross-beam thus may be movable in a direction that is generally parallel with the plane of the base. In some embodiments, the cross-beam may move in this manner for up to about 15 microns. If the cross-beam exceed this limit, it may move in a generally diverging manner (with respect to the plane of the base)—i.e., toward or away from the cross-beam. In alternative embodiments, at least one of the support beams may have a second pair of opposing springs oriented and configured to permit movement in the direction that is generally orthogonal to the longitudinal axis of the cross-beam.

As noted, the coordinate measuring machine may have more than one support beam. Specifically, it may have a plurality of support beams, where each of the plurality of beams has first and second springs spaced in a direction that is generally parallel with the longitudinal axis of the cross-beam. Moreover, the at least one support beam may be formed at least in part from metal having a beam coefficient of thermal expansion that is different from that of the base. For example, the base may include granite while the support beam (i.e., the portion contacting the base) comprises steel. Also, as with many other such devices, the coordinate measuring machine also may have a probe arm movably coupled with the cross-beam.

In accordance with another embodiment of the invention, a coordinate measuring machine has 1) at least one support beam having a top end and a bottom end, 2) a cross-beam supported on the top end of the at least one support beam, and 3) a base supporting the bottom ends of the at least one beam. The machine also has a track, secured to the cross-beam, having a longitudinal axis that is generally parallel with the longitudinal axis of the cross-beam. The cross-beam is considered to have a main body, a plurality of securing regions for securing the track to the cross-beam, and at least one pair of springs. The pair of springs connects one of the securing regions to the main body.

The springs, main body, and securing region may form a cut-out in the cross-beam. Thus, the springs may be integral with the cross-beam. Moreover, the cross-beam may have a plurality of spring pairs, where each spring pair connects its securing region to the main body. To secure the track to the cross-beam, the machine also may have a plurality of fasteners that each extend from the track and into one of the securing regions. In some embodiments, one of the securing regions is integral with and directly connected with the main body to form an anchor.

In accordance with another embodiment of the invention, a coordinate measuring machine has 1) at least two support beams that each has a rigid member at an end and an offset riser at another end, 2) a cross-beam supported at a first end by the support beam, and 3) a base supported at the opposite (second) end of the support beam. The rigid member and the offset riser are in physical contact with one another and the offset risers are adapted in a manner to elastically bend in a direction parallel to a longitudinal axis corresponding to the cross-beam. As such, the surface of a riser is stationary to the surface it contacts, including, for example, the platform, the support beam, and the cross-beam. Thus, the riser may elastic bend and shift merely in a single direction when under thermal stress. A second riser may be disposed on a second support beam to provide movement in another direction. The second riser may be oriented parallel to the longitudinal axis of the direction of movement. The riser may be a support structure having a first spring and a second spring. Each spring may be spaced apart from the other spring in a manner that allows movement in a single direction.

In accordance with another embodiment of the invention, a coordinate measuring machine has a support structure having a top and bottom portions. The top and bottom portions may be disposed to each other and are adapted to frictionally slide therebetween. The support structure has a first spring and a second spring. Each of the spring is spaced apart from the other spring and is affixed to the top portion and the bottom portion in a manner that allows movement in a single direction. Thus, the support structure may elastic bend in a direction when under thermal stress.

In accordance with another embodiment of the invention, a method of calibrating a coordinate measuring machine is provided. The method includes providing a coordinate measuring machine according to the various embodiments of the invention. In a preferred embodiment, the coordinate measuring has 1) an anchor beam with a top end and a bottom end, 2) at least one support beam having a top end and a bottom end, and 3) a cross-beam supported on the top ends of both the anchor beam and the at least one support beam. In addition, the coordinate measuring machine also has 4) a base supporting the bottom ends of the anchor beam and the at least one support beam. At least one of the support beams has a first spring and a second spring where, preferably, the first spring is spaced from the second spring in a direction that is generally parallel with the longitudinal axis of the cross-beam. The method includes measuring, while the coordinate measuring machine is at rest, a spatial offset by a linear encoder that is oriented along the direction generally parallel with the longitudinal axis of the cross-beam. The method includes determining a difference in expansion or contraction between the platform and cross-beam. The method includes storing the difference data and encoder data in a parameter map, which may be retrieved and applied to measurements of the object being measured by the coordinate measuring machine.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 6C schematically shows a side view of a spring that may be used with alternative embodiments of the invention.

FIG. 6D schematically shows a side view of another spring that may be used with alternative embodiments of the invention.

FIG. 6E schematically shows yet another spring that may be used with alternative embodiments of the invention.

DESCRIPTION OF ILLUSTRATIVE EMBODIMENTS

In illustrative embodiments, a coordinate measuring machine (i.e., a "CMM") has specially configured beams to mitigate thermal differences that can cause erroneous measurements. To that end, the CMM has a support beam with springs that enable its movable assembly to move generally parallel with its base for some pre-specified maximum distance. The springs may be considered a material region adapted to elastically deform within the rigid structure of the support beam. In another alternative embodiment, the spring may be employed in a component separate to, but anchored with, the support beam. Alternatively or in addition, also to mitigate erroneous measurements, various embodiments form springs in the region where a movable assembly guide track secures with an underlying cross-beam. Details of illustrative embodiments are discussed below.

Figure 1A:
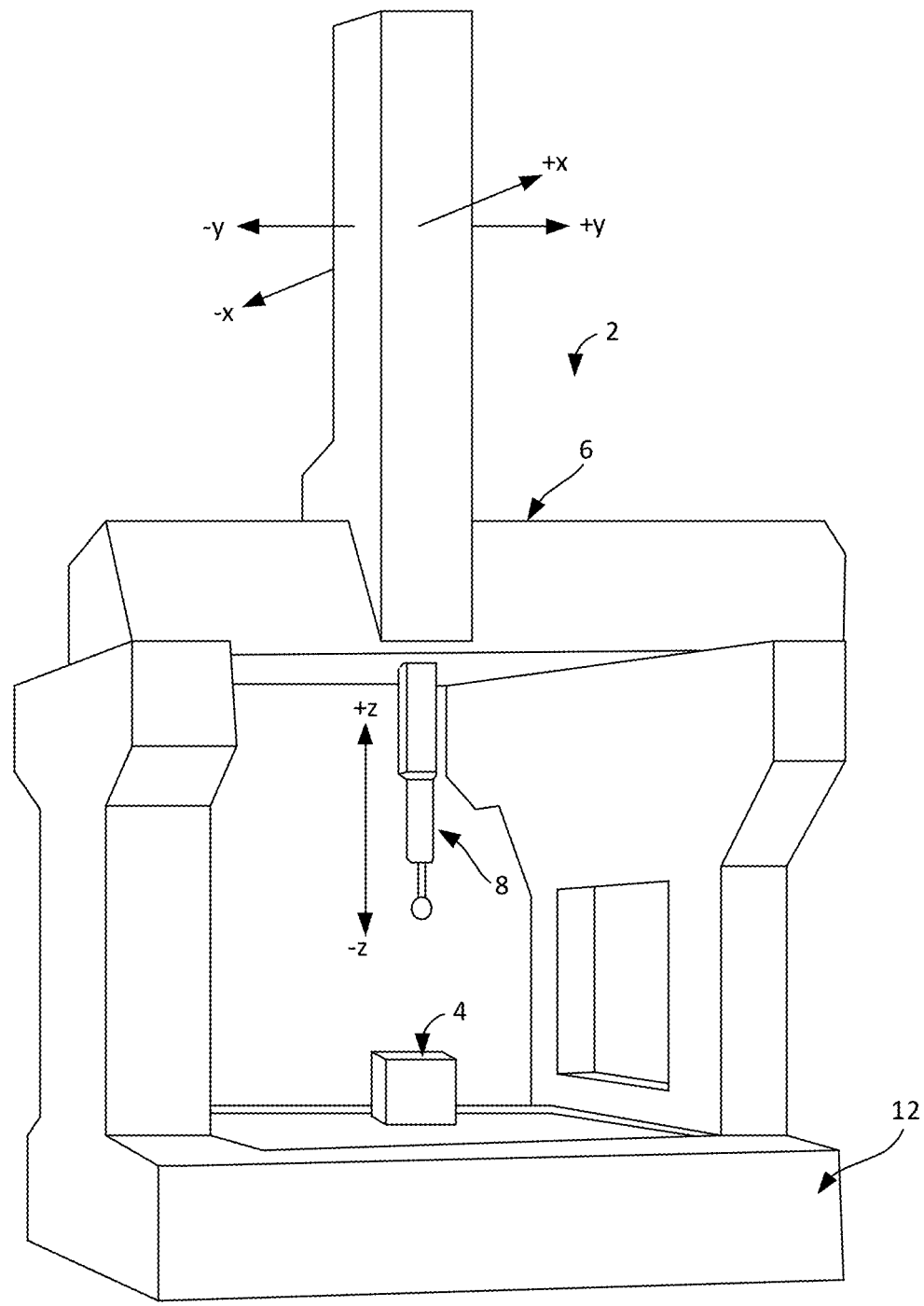
FIG. 1A schematically shows a coordinate measuring machine in accordance with illustrative embodiments.

FIG. 1A schematically shows a coordinate measuring machine 2. As with other CMMs, the CMM 2 has a generally rectangular base (referred to herein as a "platform 12") for supporting an object 4 to be scanned, and a scanning apparatus 6 movably connected to the platform 12 for gathering topographical information about the supported object 4. The platform 12, which can be formed from any of a variety of materials, such as cement or granite, has an array of holes for fixedly securing the object 4 to its top surface.

To gather geometric surface information about the object 4, the scanning apparatus 6 has a movable scanning probe arm 8 that contacts or probes the object 4. The scanning apparatus 6 and its arm 8 thus preferably are movable in three dimensions—the X-direction (parallel to the length of the platform 12), the Y-direction (parallel to the width of the platform 12), and the Z-direction (toward and away from the top surface of the platform 12). To that end, the CMM 2 has a drive mechanism (not shown) that moves the entire scanning apparatus 6 in the X-direction along, for example, a guide track 14 (not shown in FIG. 1—see FIG. 1C and others). Among other things, the drive mechanism may include servo controllers and other precision movement equipment.

Figure 1B:
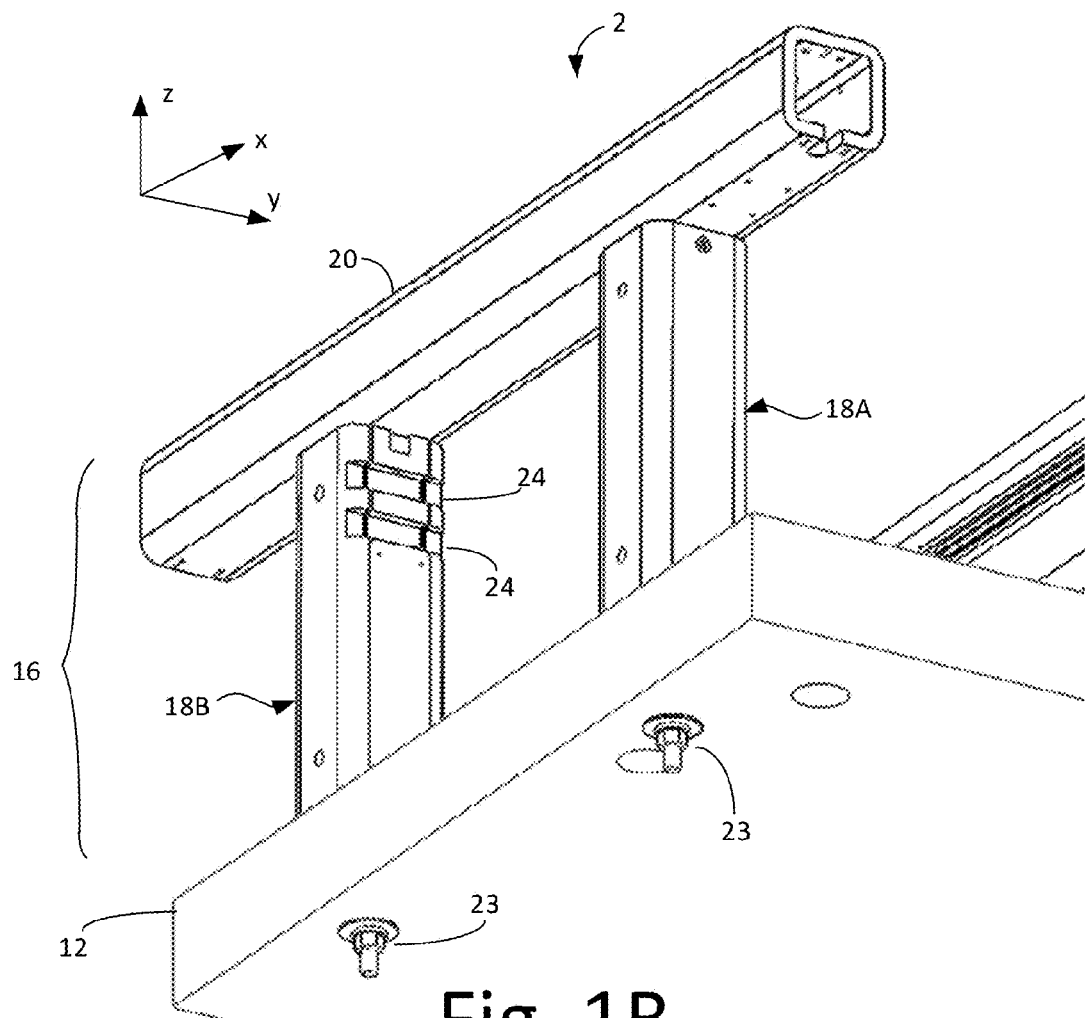
FIG. 1B schematically shows a portion of a coordinate measuring machine configured in accordance with illustrative embodiments of the invention.

FIG. 1B schematically shows relevant portions of a coordinate measuring machine (hereinafter "CMM 10") configured in accordance with illustrative embodiments of the invention. In illustrative embodiments, the guide track 14 (not shown—see FIGS. 1C and 5B), which guides the scanning apparatus 6, is mounted on a specially configured support structure 16 that enables the movable assembly to move generally parallel with the platform 12. Specifically, the support structure 16 has two support beams 18A and 18B mounted to the platform 12 at their respective bottom ends, and a cross-beam 20 coupled with and extending across the top ends of the support beams 18A and 18B. The cross-beam 20 is oriented such that its longitudinal axis is generally parallel with the platform 12, and generally perpendicular with the longitudinal axes of the support beams 18A and 18B.

Figure 1C:
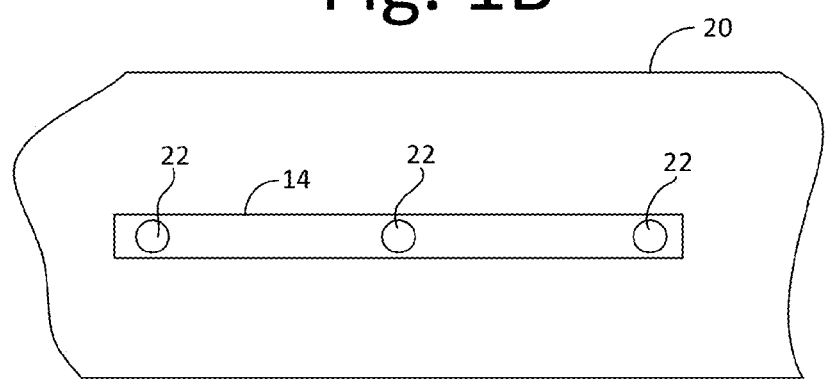
FIG. 1C schematically shows a top view of the cross-beam and track in accordance with some embodiments of the invention.

FIG. 1C schematically shows a top view of the cross-beam 20 without the movable scanning apparatus 6, more clearly showing the track 14. As shown, the track 14 mounts directly and flush against the top face of the cross-beam 20, with its longitudinal axis generally parallel with the longitudinal axis of the cross-beam 20. To that end, three bolts or fasteners 22 extend through the track 14 and into the cross-beam 20. Indeed, more fasteners 22 can be used.

Those skilled in the art understand that the track 14 should be stationary and stable to ensure that the scanning apparatus 6 moves primarily along the x-axis only, i.e., the scanning apparatus 6 should move no more than negligibly in any other direction to ensure accurate measurements. Illustrative embodiments specially configure the cross-beam 20 toward that end. These configurations are discussed in greater detail below with regard to FIGS. 6 and 7.

Referring back to FIG. 1B, the two support beams 18A and 18B each are fastened directly to the platform 12 by any conventional means. For example, a conventional nut, bolt, and washer arrangement 23 may serve this purpose. Of course, other fasteners can be used and thus, nuts, bolts, washers are but examples of many different ways to make this connection. In illustrative embodiments, the beams 18A, 18B, and 20 are formed from hollow metal tubes. The inventors discovered that their direct contact with the platform 12 undesirably adds error into the system. Any of various types of material may be used as the platform 12, including, for example, granite, cast iron, steel, concrete, aluminum, and various types of polymers.

In particular, the inventors noticed that the scanning apparatus 6 produced erroneous readings that could be inaccurate by many microns. Such error is unacceptable in the precision metrology space, which commonly measures distances in the single digits of microns. After some analysis, the inventors discovered that the coefficient of thermal expansion differential between the support structure 16 and the platform 12 was one primary source of this error. Specifically, forces generated between the interface of the support beams 18A and 18B, the cross-beam 20, and the platform 12 undesirably moved support beams 18A and 18B in a manner that caused the cross-beam 20 to distort, generally in an elastic manner, thereby causing a bow at a very high radius. If the cross-beam 20 bows in this manner, then the track 14 bows in a corresponding and potentially amplified manner, which adversely impacts movement of the scanning apparatus 6.

Figure 2A:
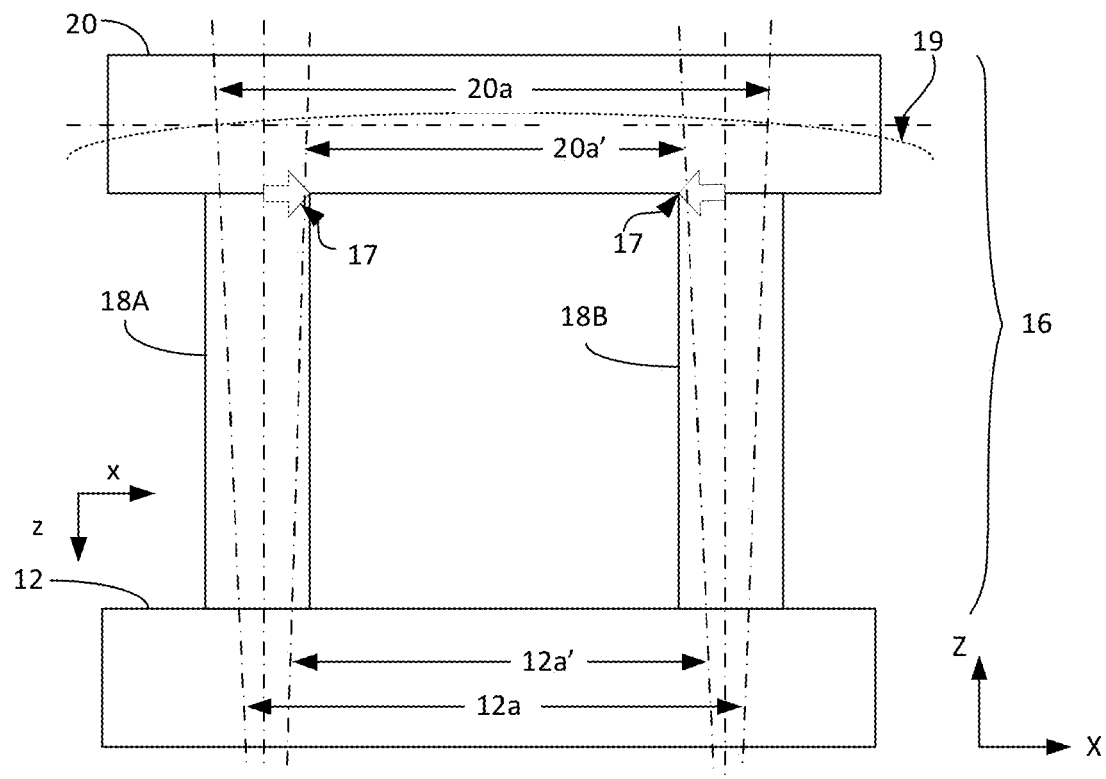
FIG. 2A schematically shows possible distortions of the cross-beam.

Specifically, FIG. 2A schematically shows possible elastic distortions of the cross-beam. Under varying temperature (dT) conditions, the platform 12 and the cross-beam 20 undergo a change of length. The change of length of the platform, $dL_{platform}$, is shown as an expansion length 12a and a contraction length 12a'. Similarly, the change of length of the cross-beam, $dL_{beam}$, is shown as an expansion length 20a and a contraction length 20a'. As such, the change of length (dL) between the cross-beam 20 and the platform 12 may be expressed in terms of equation 1, where "α" is the coefficient of thermal expansion (in m/m° C.); "dT" is the difference in temperature (° C.); and "L" is the length between the fastening location of the platform 12 or the cross-beam 20 (m).

$$dL_{beam} = \alpha_{beam} \cdot dT \cdot L$$

$$dL_{platform} = \alpha_{platform} \cdot dT \cdot L \quad \text{(Equation 1)}$$

As such, the difference in expansion between the platform 12 and the cross-beam 20 (referred as $\Delta dL_{platform-beam}$) may be expressed in equation 2.

$$\Delta dL_{platform-beam} = \quad \text{(Equation 2)}$$
$$\alpha_{platform} \cdot dT \cdot L - \alpha_{beam} \cdot dT \cdot L = |\alpha_{platform} - \alpha_{beam}|(dT \cdot L)$$

This difference in expansion generates a shearing force 17 (here, shown for thermal expansion) between each of the support beams 18A and 18B and the cross-beam 20. As a rigid structure, the support structure 16 bends (as much as 15 microns) to form a trapezoid-like structure with a bending component, shown as arc line 19. Of course, the structure may distort in any degree of movements, including offsets in the X-direction, the Y-direction, and the Z-direction, as well as angular bending corresponding to pitch, yaw, and rotation. Assuming the temperature between the cross-beam 20 and the platform 12 is the same, the temperatures may be different from when the CMM 10 was initially characterized.

As used herein, the term "pitch" refers to angular movement in the x-z plane, the term "yaw" refers to angular movement in the y-z plane, and the term "rotation" refers to angular movement in the x-y plane. Additionally, the terms "X-direction", "Y-direction", and "Z-direction" are interchangeably used with the corresponding terms "x-axis", "y-axis", and "z-axis", where the axis are directions of the Cartesian coordinate system.

Figure 2B:
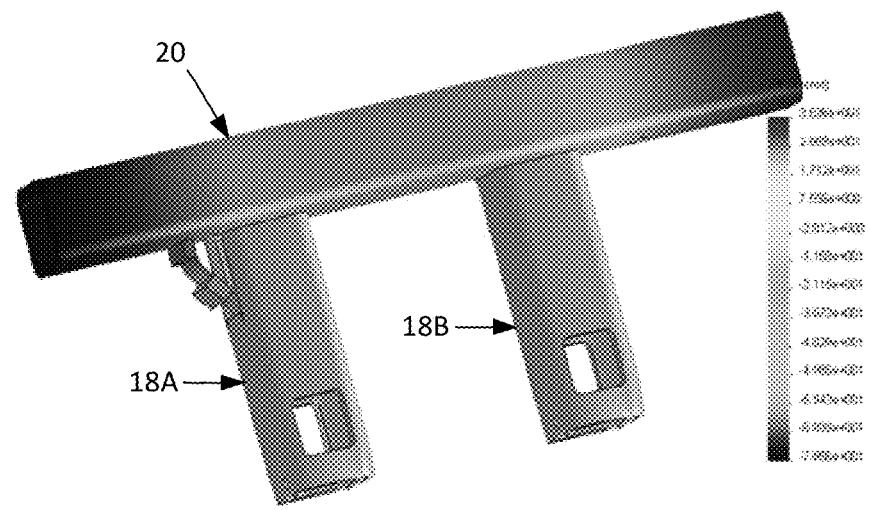
FIG. 2B schematically shows a finite element analysis of the possible elastic distortions of FIG. 2A.

FIG. 2B schematically shows a finite element analysis of the possible distortions of FIG. 2A. From the analysis, the stress are shown being the greatest at the ends of the cross beam 20 which urges the cross beam to upwardly bend near the support beam 18B end and downwardly bend near the support beam 18A.

After analysis and experimentation, the inventors discovered that forming springs 24 on at least one support beam (identified by reference number 18B), while maintaining one support beam (identified by reference number 18A) with no springs 24, mitigated this adverse result. The one support beam 18A having no spring 24 acts as an anchor and thus, may be referred to as an "anchor beam 18A," while the other support beam 18B (or beams) flex in a controlled manner as necessary to mitigate the noted coefficient of thermal expansion differential. The support beam 18B having the spring(s) 24 may be referred to as the "compensation beam 18B."

Figure 3A:
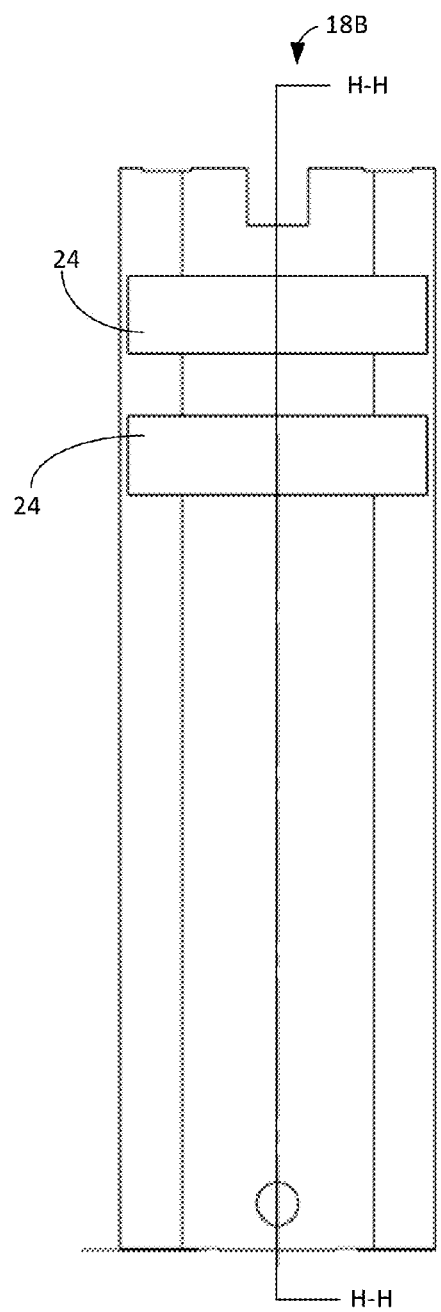
FIG. 3A schematically shows a side view of a support beam configured in accordance with illustrative embodiments of the invention.
Figure 3B:
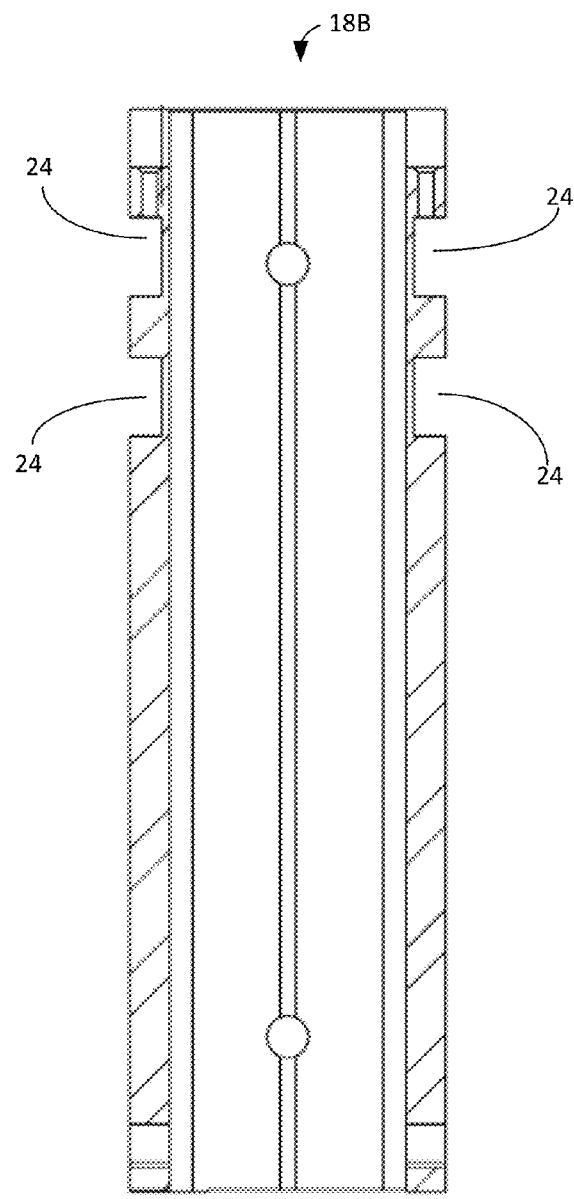
FIG. 3B schematically shows a cross-sectional view of the support beam shown in FIG. 4A along cross-line H-H.

To that end, FIGS. 1B, 3A and 3B schematically show more details of this arrangement, and the springs 24 that produced this desire result. The springs 24 illustratively form a "lazy-S" arrangement to produce the desired controlled movement and deformation. Specifically, this spring shape (in the configuration of FIGS. 1B, 3A and 3B) provides for linear movements in the X-direction (i.e., parallel with the longitudinal axis of the cross-beam 20) for a pre-specified distance while providing rigid support in the Y-direction. Put plainly, the springs 24 in the compensation beam 18B provide a uni-directional bending movement. The springs 24 in combination with the anchor beam 18A, the cross-beam 20, and the platform 12 form a stretchable bending mechanical linkage analogous to an elongating pantograph. Similar to parallelogram, the linkage is connected in a manner so that movements from a minute deformation of the support structure 16 may be in only a single direction within the pre-specified distance and no displacement in other directions. Such movements are generally more linear when compared to a single spring, which may produce a pivoting movement.

Figure 5A:
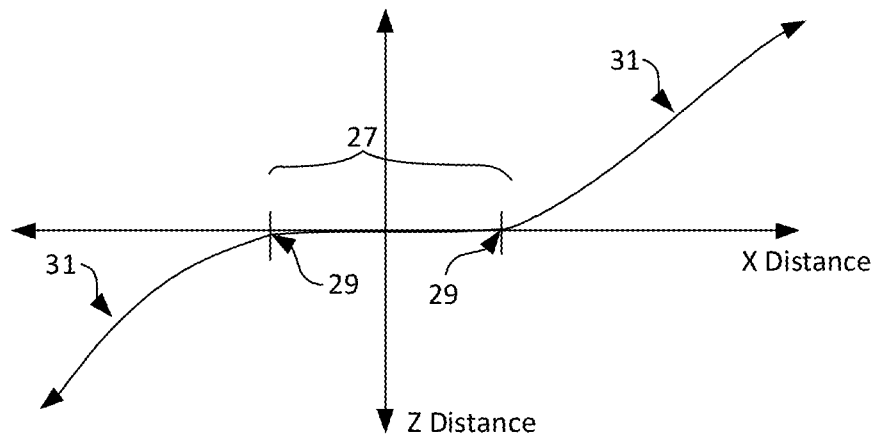
FIG. 5A graphically shows the generalized movement reaction of the cross-beam in accordance with illustrative embodiments.

The compensation beam 18B has at least two sets of opposed springs 24 spaced in the X-direction. In other words, the compensation beam 18B has a first spring 24 (or set of springs 24) facing the anchor beam 18A, and another spring 24 (or set of springs 24) on the opposite side (180 degrees opposed—not shown in FIG. 1B, but shown more clearly in FIGS. 3A and 3B). As discussed below with regard to FIG. 5A, illustrative embodiments require these two sets of springs 24 to compensate for unintended movement in both directions along the x-axis, and as noted, to prevent unintended movement in directions not in the X-direction. While the compensation beam 18B and the springs 24 allow for controlled movement in a pre-specified direction while hindering movements in others, they are not intended to pivot. As such, the compensation beam 18B provides, in its entirety with the spring 24, structural support within the supporting structure 16 in all degrees of movements.

In employing mechanical structures that deform to compensate for unintended movement along an intended axis (e.g., the x-axis), a CMM adapted with compensation beam 18B and springs 24 may be utilized in harsh manufacturing or shop environments. While air bearings may, for example, be adapted to reduce thermal expansion errors by providing a low friction interface for movement in the X-direction, air bearings are generally not suited for such environments for various technical and cost reasons.

Moreover, a CMM adapted with the compensation beam 18B and spring 24 according to the illustrative embodiments may be employed to augment the calibration of the CMM. The calibration of a CMM may be determined by a set of parameters, including, for example, displacements and rotations relative to the various degrees of freedom. An example of CMM configuration is described in U.S. Pat. No. 8,290,733, titled "Modular Calibration," which is incorporated herein in its entirety. As described above, the springs 24 may be adapted to compensate for unintended movement in both directions along the x-axis and to prevent unintended movement in directions not in the X-direction. As such, the compensation beam 18B and springs 24 reduces the support structure 16 to only a single degree of freedom allowing, when calibrating for thermal expansion, (i) the CMM to require a single linear encoder configured to measure in the X-direction, and (ii) the CMM to reduce the number of calibration parameters for static calibration to a simplified parameter set, which may consist of a single parameter. The static calibration of the CMM can be regarded as a correspondence, or map M, between a parameter space of the CMM whose elements are represented by vectors of parameters where the values of the vectors may be known from the encoders of the CMM.

Figure 5B:
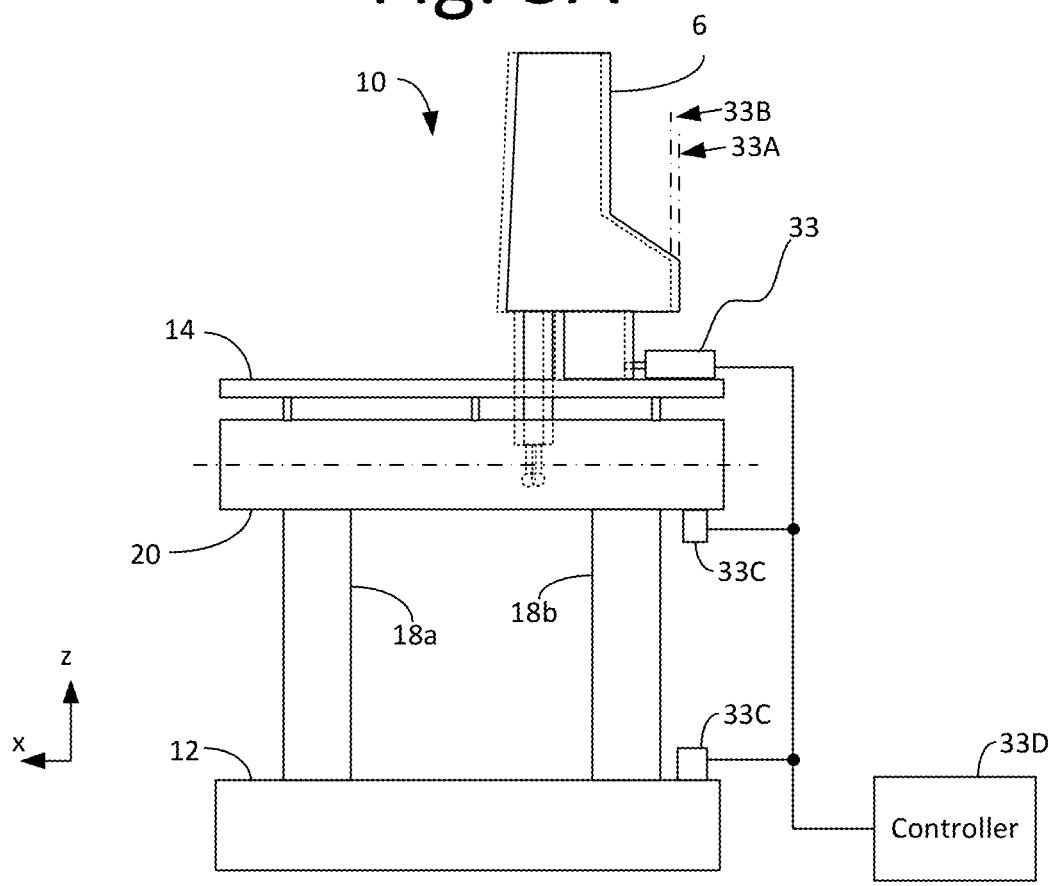
FIG. 5B schematically shows a coordinate measuring machine with a linear encoder oriented to measure along a generally parallel direction with the longitudinal axis of a cross-beam.

FIG. 5B schematically shows a coordinate measuring machine 10 with a linear encoder 33 oriented to measure along a generally parallel direction with the longitudinal axis of the cross-beam 20 and track 14. To perform a static calibration of the CMM 10 as described above, the linear encoder 33 measures a first x-position 33A of the scanning apparatus 6 at a first temperature difference between the platform 12 and the cross-beam 20 and a second x-position 33B at a second temperature difference between the same. The encoder data of positions 33A and 33B may be stored as part of a vector of parameters along with the first and second temperature difference within parameter map M as described above. The temperatures of the platform 12 and cross-beam 20 may be measured with temperature sensors 33C and stored in a controller 33D that is configured to perform the static calibration.

Alternatively, rather than temperature sensors, the temperature difference between the platform 12 and cross-beam 20 may be measured by the resulting strain caused by temperature using a strain-gauges disposed, for example, on the support beams 18A and 18B.

Figure 11:
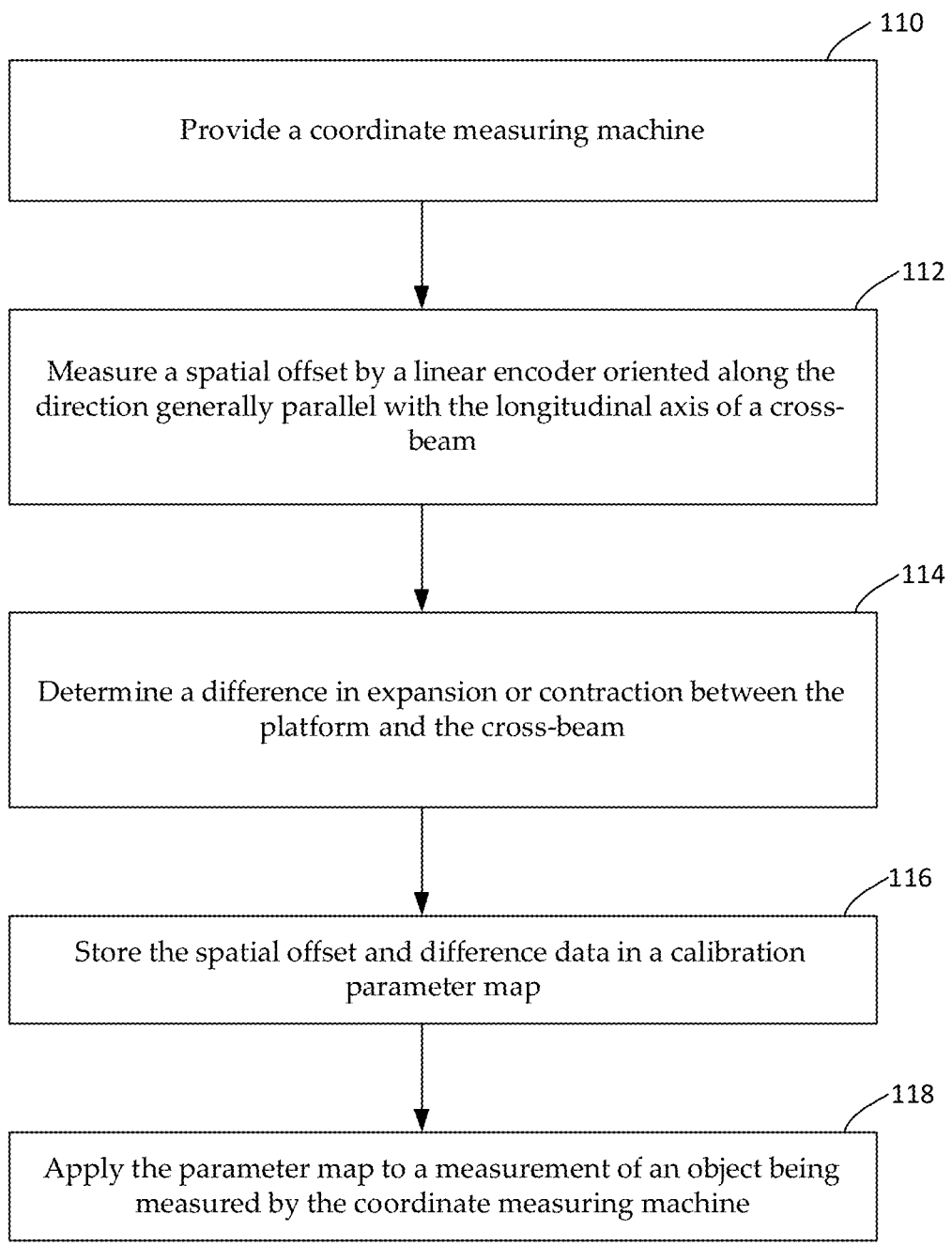
FIG. 11 is a flowchart of a method of calibrating the CMM according to an illustrative embodiment.

FIG. 11 is a flowchart of a method of calibrating the CMM according to an illustrative embodiment. The method is described with reference to FIGS. 5B and 11. Using the various embodiments described herein (step 110), the calibration may begin (step 112) with the linear encoder measuring a spatial offset corresponding to the encoder. The system may determine a difference in expansion and contraction between the platform 12 and the cross-beam 20 (step 114). To do so, the system may measure a given temperature difference between the cross-beam 20 and the platform 12. Alternatively, the system may measure strain of the support beam at the springs 24 using strain gauges or displacement sensors. The spatial offset may be stored as a part of a vector in a parameter map along with the difference data (step 116). During operation, the controller 33D may apply the parameter map (step 118). This operation may correspond to the measurement of the object 4 by the CMM 10.

The measurement may be a static calibration that is performed subsequent to the assembly of the CMM 10. The linear encoder may be the same encoder utilized during normal operation or it may be a separate reference encoder (e.g., laser interferometer, thread edges, etc.) used specifically for calibration. The encoder is oriented to measure in parallel with the axis of the pre-specified parallel movement (e.g., with the longitudinal axis of the cross-beam 20).

Various steps may be combined in a single operation without departing from the disclosure herein. For example, steps 112 and 114 of measuring the spatial offset and the determining the contraction/expansion may be performed independently or separately of each other.

Various embodiments can use any of a number of different types of springs. For example, the springs 24 shown in FIGS. 1B, 3A and 3B are integral springs machined into the side walls of the compensation beam 18B. To that end, FIG. 3A schematically shows a front view of the compensation beam 18B when viewed along the x-axis, while FIG. 3B schematically shows a side view of that same beam 18B. The side walls may be made of, for example, steel, aluminum, ceramics, and other material generally used for CMM.

FIG. 3B schematically shows a cross-sectional view of the beam 18B along across line H-H. As shown, the springs 24 simply are formed from areas of the walls of compensation beam 18B having reduced thicknesses along the x-axis. For example, the wall thickness normally may be approximately 12.7 mm, while the thinned areas forming the springs 24 may be approximately 2.5 mm. Various wall thicknesses may be employed according the illustrative embodiments, and the specific dimensions may be determined such that the stress from the noted shearing forces is less than 15% of the ultimate yield strain of the side wall material to avoid fatigue and mechanical-life concerns.

The springs 24 shown in the figures also have a thick region between two thinner regions to further fine-tune beam movement. It should be noted that those skilled in the art can configure and specify the type of springs to have the appropriate behavior when subjected to anticipated stresses. Accordingly, discussion of specific sizes and types of springs are not intended to limit all embodiments the invention.

During use, stress created at the interface of the anchor beam 18A, the cross-beam 20, the compensation beam 18B, and the platform 12 cause an aggregated force that impacts the compensation beam 18B. The compensation beam 18B receives this force and, with its springs 24, provides the appropriate stress relief to maintain fidelity of the measurements taken by the CMM 10. Qualitatively, the compensation beam 18B receives the force and, due to the springs 24, controllably causes the cross-beam 20 to move in a manner that is generally parallel to the X-axis for a prescribed distance. The spring 24 provides a pre-defined elastic region in the material that may compress, stretch, or rotate in the X-axis and Z-axis with respect to the other rigid structures of the support structure 16.

Figure 4A:
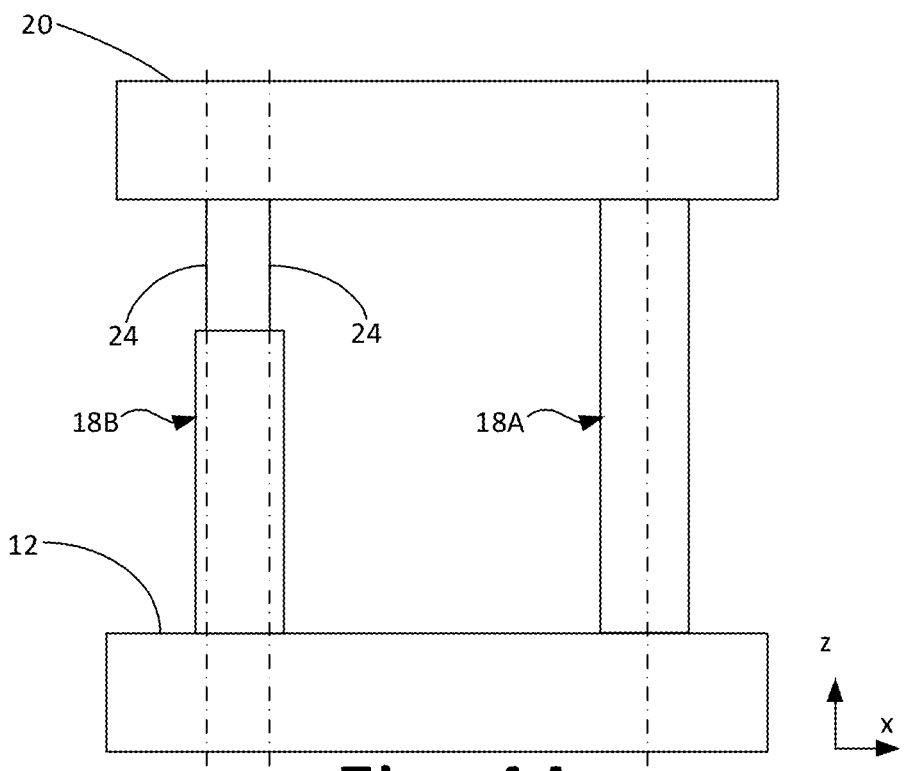
FIG. 4A schematically shows the first and second springs in the support beam in accordance with illustrative embodiments of the invention.
Figure 4B:
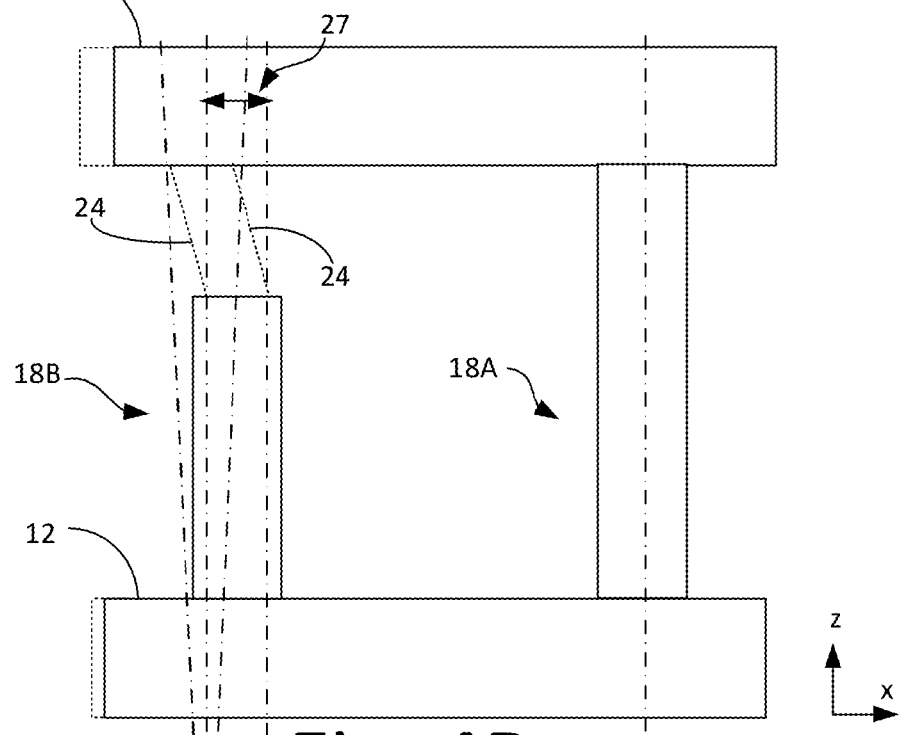
FIG. 4B schematically shows parallel movements between the crossbeam and the platform in accordance with illustrative embodiments of the invention.

FIGS. 4A-4B and 5A graphically show this phenomenon, where the flat region 27 near the origin of FIG. 5A represents this parallel movement along the X-axis. FIG. 5A also shows how the cross-beam 20 stops moving in the desired manner after reaching the prescribed distance 29. In other words, after traveling approximately the prescribed distance 29, the cross-beam 20 undesirably may start moving in a manner that diverges (referred to as "diverging region 31" with the plane of the platform 12 (i.e., along the z-axis). The flat region 27 and the diverging region 31 may be the result of deflections of the compensation beam 18B at the springs 24. FIGS. 4A and 4B schematically illustrate the support structure 16 in thermal equilibrium (see 4A) and under thermal stress (see 4B). As shown in FIG. 4B, the springs 24 are adapted to provide a uni-axial-deforming region for parallel movement that may allow for the anchor beam 18A to remain generally fixed. Of course, those skilled in the art should understand that the prescribed distance should be selected, if possible, to ensure that this diverging movement occurs only in rare circumstances.

The prescribed distance of the desired parallel movement can be selected and configured based upon the many properties of the underlying system. The differential of the coefficients of thermal expansion and their impact should thus be experimentally tested or computationally analyzed to determine the appropriate distance, which drives the spring selection and, in some instances, material selection. For example, in some implementations, the compensation beam 18B produces this parallel movement 27 for approximately 15 microns. Such a small amount can be critical in highly precise metrology applications where, as noted above, measurements in the single microns often are critical.

Figure 6A:
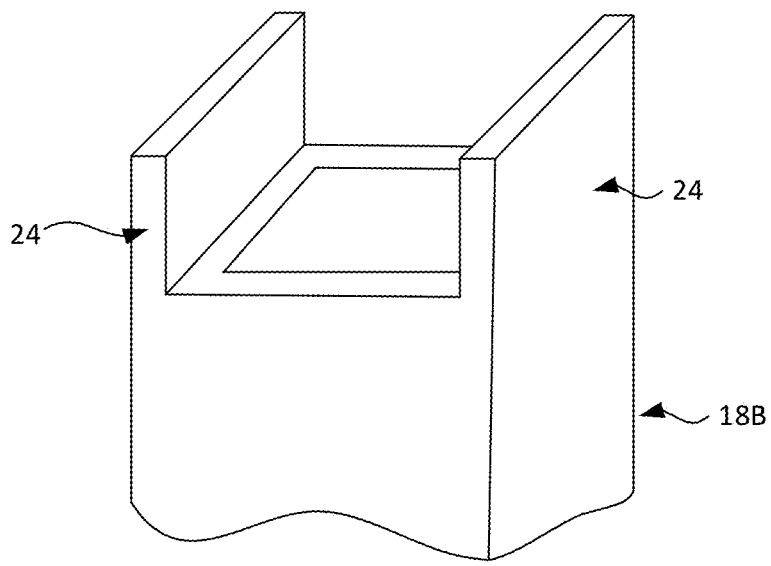
FIG. 6A schematically shows a perspective view of a spring that may be used with alternative embodiments of the invention.
Figure 6B:
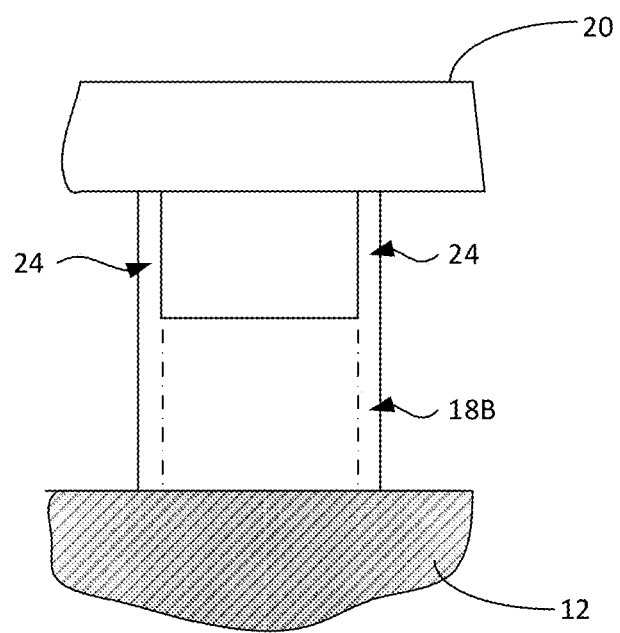
FIG. 6B schematically shows a side view of the spring of FIG. 6A with the cross-beam supported on its top end.

FIGS. 6A-6E schematically shows the various types of springs used by various embodiments. FIGS. 6A and 6B schematically show perspective and side views of another type of spring 24 used by alternative embodiments. In that case, rather than having thinner sidewalls, the springs 24 have open sidewalls to form a leaf springs that functions similar to the springs described above. This alternative type of springs 24 is but one of a plurality of different types that may be used. Accordingly, various embodiments are not limited to this type of springs 24, or the specific types of springs 24 described above.

FIGS. 6C-6E schematically shows side views of various types of springs used by alternative embodiments. In FIG. 6C, the springs 25A includes a rounded region 27. The rounded region 27 are adapted to reduce stress at the corner of a square cut that form the springs 25A, thereby reducing propagation or initiation of a crack due to mechanical cycling. FIG. 6D schematically shows springs 25A of FIG. 2C that are offset to each other. FIG. 6E schematically shows a rounded region 27 adapted to reduce stress at a corner of a triangular cut that form the springs 26A. Any other of various geometries may be employed to produce the springs, including, for example, round, ellipses, slots, strips, among others.

It is noted that the various embodiments have pairs of springs that are positioned to protect against movement in the Y-direction. Any type of spring capable of performing the necessary function should suffice, such as those shown in FIGS. 3A-3D and those in FIGS. 6A-6E.

Moreover, the CMM 10 could have more than one compensation beam 18B. Illustrative embodiments, however, have only one anchor beam 18A.

Figure 7A:
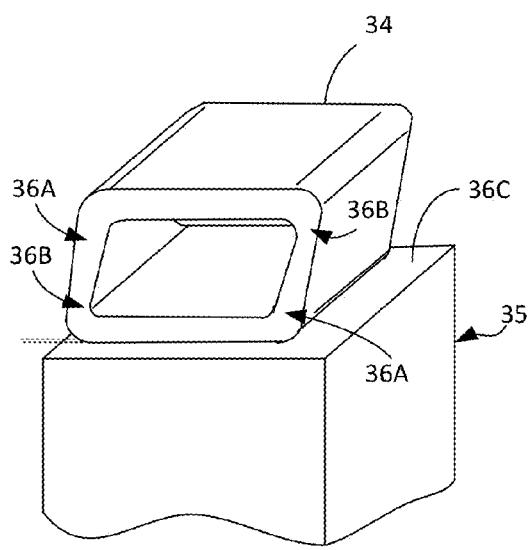
FIG. 7A schematically shows a perspective view of a spring that may be used with another illustrative embodiment of the invention.
Figure 7B:
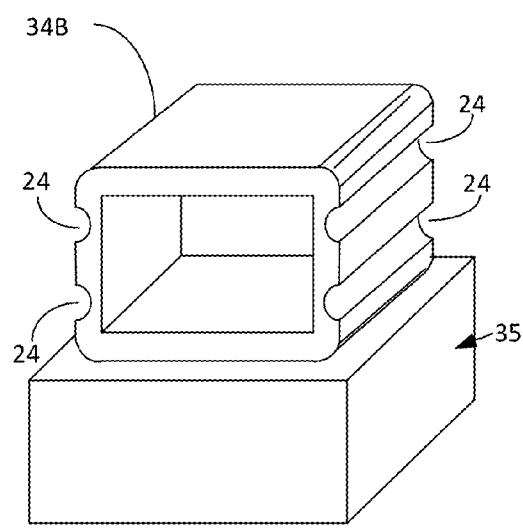
FIG. 7B schematically shows a perspective view of a riser with springs that may be used with another illustrative embodiment of the invention.
Figure 7C:
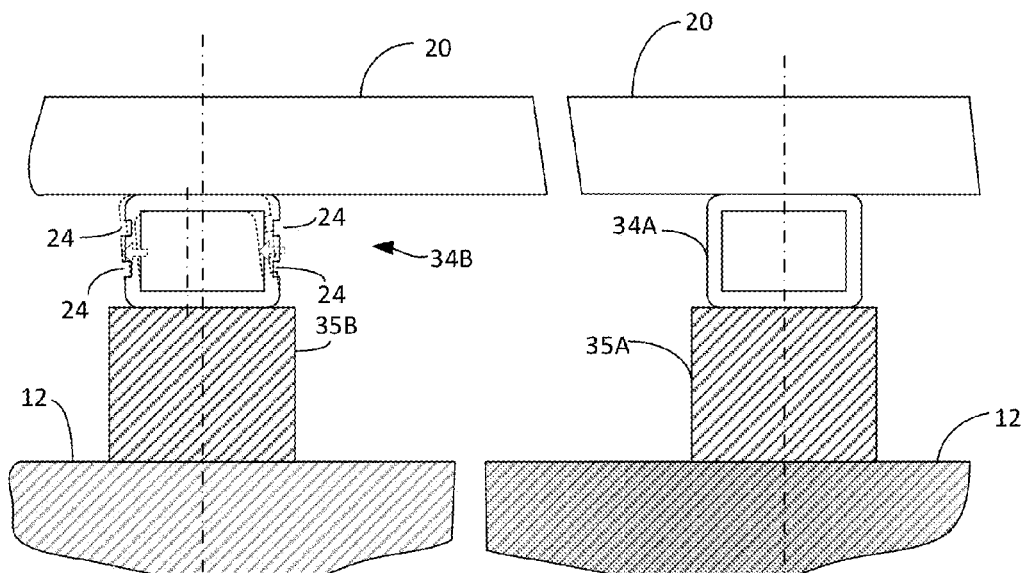
FIG. 7C schematically shows a side view of risers in FIGS. 7A and 7B that may be adapted to bend in a pre-specified manner and direction according to another embodiment of the invention.

In another embodiment, the support beams may have a separate member coupled therewith that have springs 24. FIGS. 7A-7C schematically show support beams 35 with risers 34. The risers 34 may be adapted to provide linear movements 27 in the X-axis that are similar to the springs 24 as shown in FIG. 5A. To promote uniform movements, the support beams 35 and risers 34 should be made identical for the number of legs employed. The support beams 35A and 35B may be made of the same material as the granite platform 12 while the risers 34 may be made of, for example, steel, aluminum, or different grades thereof. The risers 34 may be a column that may be solid or hollow. The risers 34 may be configured with a deformable region (i.e., having compliance characteristics) in relation to the other support structures to keep the geometry undistorted in a pre-specified direction. As such, the CMM 10 may be configured to have ideal characteristics that may move without mechanical hysteresis (e.g., due to slippage or sliding). Of course, any of various types of shapes may be employed, include C-shape, U-shape, I-shape, O-shape, Z-shape, among others known in the art.

Specifically, FIG. 7A shows a single support beam 35 with a riser 34. Here, the support beam 35 may be made of the same material as the platform 12 and may be fastened thereto by any of various means described above. The risers 34 may be a cast object or a section portion of a tube that is placed on its side. The riser 34 may have varying wall thickness sections 36A and 36B. As such, the riser 34 may elastically bend as a springs 24. FIG. 7B shows a single support beam 35 with a riser 34 having springs 24.

FIG. 7C schematically shows a side view of the risers 34 in FIGS. 7A and 7B that may be adapted to bend in a pre-specified manner and direction according to another embodiment of the invention. As shown in FIG. 7C (in a scenario of thermal expansion), the risers 34A are disposed on the anchor beam 35A, while the risers 34B are adapted with springs 24 to elastically move. The open sidewalls may also form leaf springs as described above. In allowing only one of the risers 34 to move, the scanning structure 6 that will be seated on the track 14 on the cross-beam 20 may move in pre-specified direction to the platform 12. The risers 34A (without the springs) are disposed between the cross-beam 20 and the support beam 35A and act in similar ways to anchor beam 18A. The riser 34A provides symmetry with the risers 34B in the other axis of movements, for example, the Z-direction, thereby maintaining the structure in an undistorted state in that direction.

The risers 34 may be fastened to either one or both of the cross-beam 20 or the support beam 35, or it may be freely disposed therebetween and maintained stationary by preload.

Figure 8A:
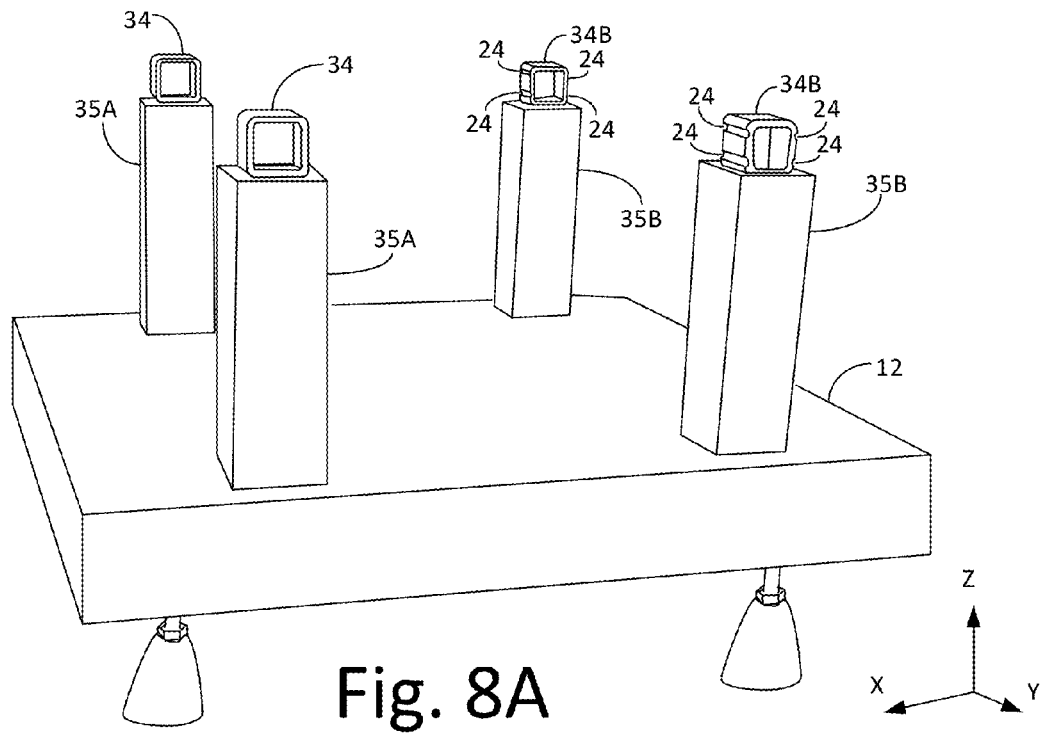
FIG. 8A schematically shows a perspective view of the pairs of riser and support beams.

In some embodiments having at least two pairs of risers 34, a first pair of risers 34A may be fastened to allow pre-specified movements for the second pair of risers 34B. FIG. 8A schematically shows a perspective view of the pairs of riser 34A and 34B and support beams 35A and 35B.

Figure 8B:
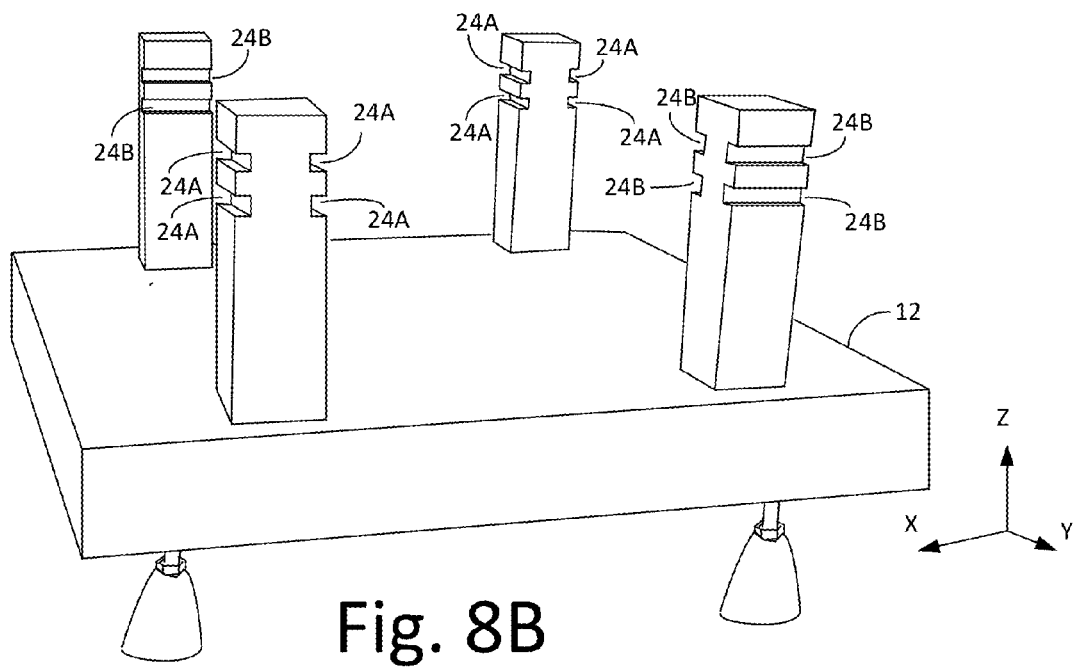
FIG. 8B schematically shows a perspective view of the pairs of compensation beams configured for movements in two axes.

Some embodiments have additional pairs of springs that are positioned to allow movement in other longitudinal axis, such as the Y-direction. FIG. 8B schematically shows a perspective view of the pairs of compensation beams configured for movements in two axes. Any type of springs capable of performing the necessary function should suffice, such as those shown in FIGS. 3A and 3B and those in FIGS. 6A-6E, 7A and 7B. To that end, these additional springs 24B are positioned approximately 90-degrees rotated or offset from the springs 24A used to compensate for movement in the X-direction. Moreover, these Y-axis springs 24B preferably are positioned on a separate beam as the X-axis springs 24A. Accordingly, in addition to relieving stress in the X direction, this embodiment also more effectively relieves stress in the Y direction.

Alternatively, the compensation beams may have a first stage and a second stage that is stacked above. As such, the Y-axis springs 24B may be a part of the second stage while the X-axis springs 24A may be a part of the first stage. Of course, multiple stages are contemplated wherein each stage includes a set of springs 24 which may be oriented in a manner so as to compensate for distortions in a pre-specified direction.

Figure 9:
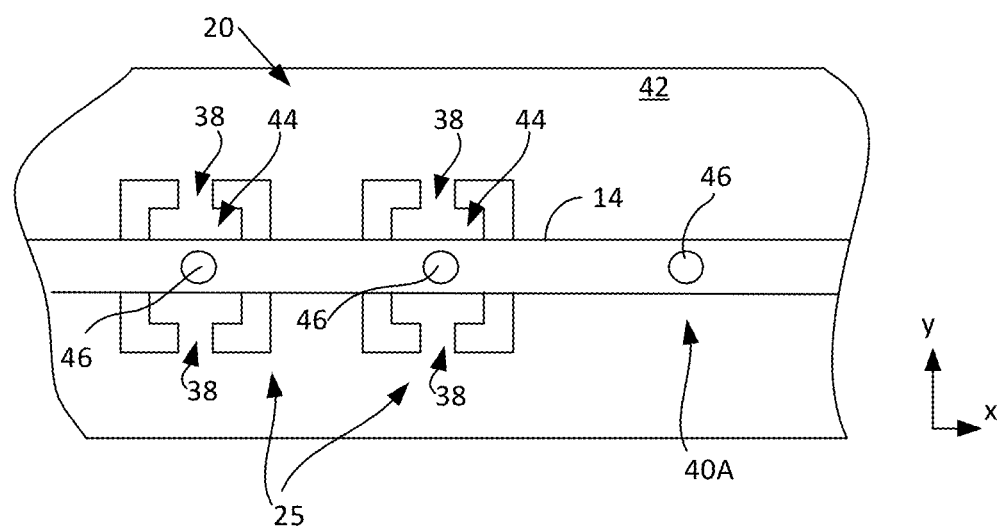
FIG. 9 schematically shows a top view of the cross-beam and track with springs in accordance with illustrative embodiments of the invention.
Figure 10:
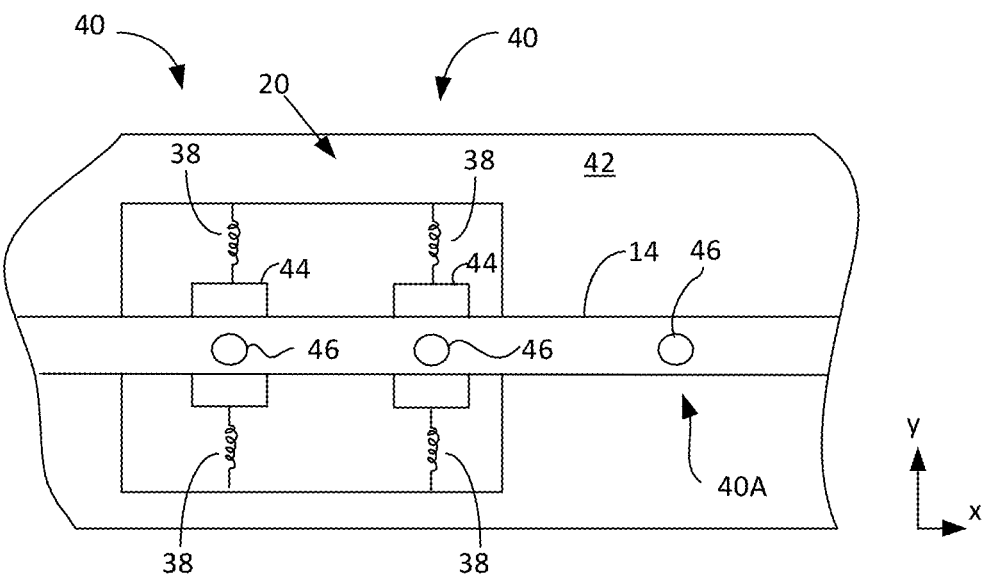
FIG. 10 schematically shows a generalized view of the arrangement in FIG. 9.

The inventors also discovered that other portions of the CMM 10 have similar stress problems related to the coefficient of thermal expansion differential at the interface of other parts of the system. Referring to FIGS. 9 and 10, one such important area is the interface of the cross-beam 20 and the track 14 that guides the scanning apparatus 6 (not shown— see FIGS. 1A and 5B). In particular, although both the track 14 and cross-beam 20 typically are formed from metal, the appropriate metals for each such component can be different. Their coefficients of thermal expansion thus can vary, which, like the above noted stresses among the beams 18A and 18B, the cross-beam 20, and the platform 12, can adversely impact the ultimate measurement of the CMM 10.

The inventors responded to this problem by forming a springs 38 and anchor system within the cross-beam 20 similar to those described above. More specifically, as shown in FIG. 10, from the perspective of the track 14 connection, the cross-beam 20 may be considered to have three primary sections:
  a main body 42,
  a plurality of securing regions 44 for receiving a fastener 46 (noted above) that secures the track 14 to the cross-beam 20, and
  a plurality of pairs of springs 38 that connect some of the securing regions 44 to the main body 42 and relieve coefficient of thermal expansion differentials.

FIG. 9 schematically shows these three components and their relationship with the track 14. FIG. 10 schematically shows these components in a more generic manner. As shown and noted above, the track 14 is secured to the top face of the cross-beam 20 so that its longitudinal axis is generally parallel with that of the cross-beam 20. A plurality of fasteners 46, also noted above (see discussion regarding FIG. 1C), provide this stationary connection through the track 14 and into the securing regions 44 of the cross-beam 20. Any conventional fastener appropriate for this application may be used, such as screws, bolts, or rivets.

Each of the securing regions 44 thus receives a single fastener 46 to secure the track 14. In addition, all but one of such securing regions 44 also has a pair of opposed springs 38 on either side of the track 14. In illustrative embodiments, the springs 38 are formed merely by cutouts in the cross-beam 20. As such, they merge integrally from the main body 42 and into the securing region 44. Of course, those skilled in the art understand that other types of springs may be used. One of the securing regions 44, however, does not have opposed springs 38. Instead, this region acts as an anchor for the entire system 40—and is identified by reference number 40A. This spring and securing region arrangement 40 thus mitigates stresses caused at the track and cross-beam interface. This also favorably should help maintain proper movement of the scanning apparatus 6 along the X-axis.

Figure 12A:
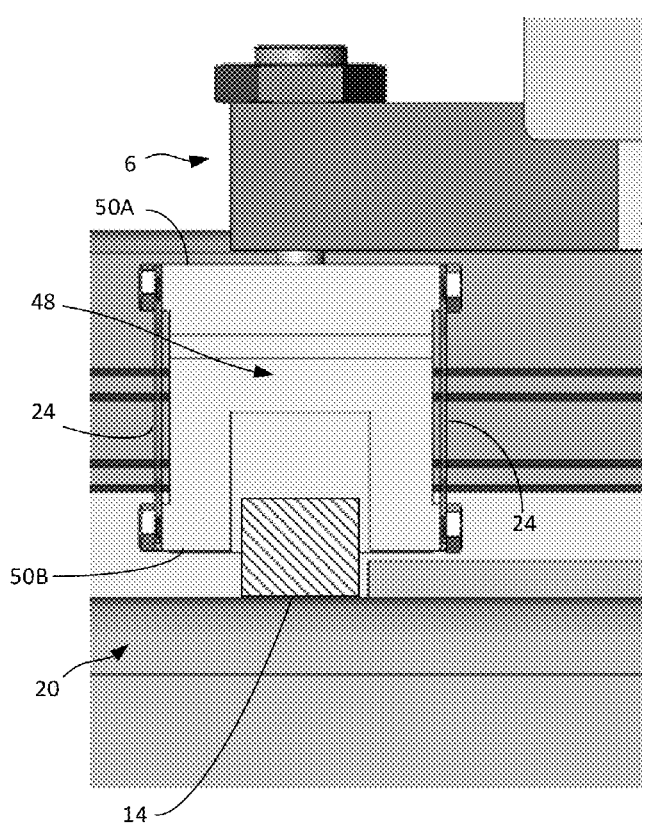
FIG. 12A shows a front view of a carriage assembly disposed between the track and the scanning apparatus in accordance with illustrative embodiments of the invention.
Figure 12B:
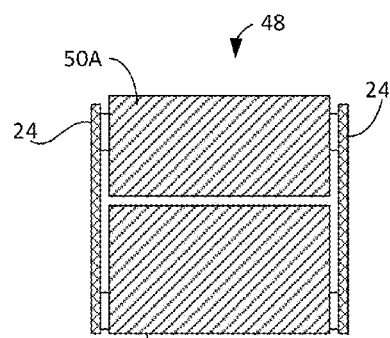
FIG. 12B is a diagram of the carriage assembly of FIG. 12A.
Figure 12C:
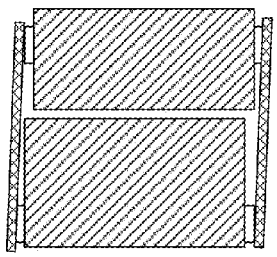
FIGS. 12C and 12D are diagrams of the carriage assembly and springs of FIG. 12 when under thermal contraction or expansion.
Figure 12D:
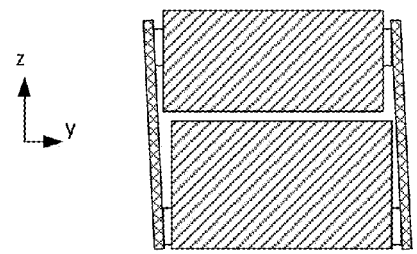

Another portion of the CMM 10 that may have similar stress problems may be at the interface between the track 14 and the scanning apparatus 6. FIG. 12A shows a front view of a carriage assembly 48 disposed between the track 14 and the scanning apparatus 6 in accordance with illustrative embodiments of the invention. Specifically, FIG. 12A shows a carriage assembly 48 having springs 24. The carriage assembly 48 may have a top portion 50A and a bottom portion 50B, which are engaged to each other via springs 24. The springs 24 may elastically deform to allow the top portion 50A and bottom portion 50B to move in Y-direction due to thermal stresses. FIG. 12B is a diagram of the carriage assembly 48 of FIG. 12A. FIGS. 12C and 12D are diagrams of the carriage assembly 48 and springs 24 of FIGS. 12A and 12B when under thermal contraction and expansion. The springs 24 form a parallelogram and ensure a linear motion for a short distance as shown in FIG. 5A.

Although the above discussion discloses various exemplary embodiments of the invention, it should be apparent that those skilled in the art can make various modifications that will achieve some of the advantages of the invention without departing from the true scope of the invention. For example, various exemplary embodiments of the invention, though shown in a gantry-type CMM, may be similarly implemented in other types of CMM, including bridge-type, horizontal-type, cantilever-type, and L-bridge bridge.

Though discussed with regarding to static calibration, it should be appreciated that the various exemplary embodiments of the invention may also address issues with dynamic calibration and similarly reduce dynamic loading stresses and vibrations.

What is claimed is:
1. A coordinate measuring machine comprising:
an anchor beam having a top end and a bottom end;
at least one support beam having a top end and a bottom end;

a cross-beam supported on the top ends of the anchor beam and the at least one support beam, the cross-beam having a longitudinal axis; and a base supporting the bottom ends of the anchor beam and the at least one support beam, at least one of the at least one support beams having a first spring and a second spring, the first spring being spaced from the second spring in a direction that is generally parallel with the longitudinal axis of the cross-beam.

2. The coordinate measuring machine as defined by claim 1 wherein the springs are integral to the at least one support beam.

3. The coordinate measuring machine as defined by claim 1 comprising a plurality of support beams, each of the plurality of beams having first and second springs spaced in a direction that is generally parallel with the longitudinal axis of the cross-beam.

4. The coordinate measuring machine as defined by claim 1 wherein the base forms a plane, the cross-beam being movable in a direction that is generally parallel with the plane of the base.

5. The coordinate measuring machine as defined by claim 1 wherein the cross-beam is movable in a direction that is generally parallel with the plane of the base for no more than about 15 microns, the cross-beam moving generally in a generally diverging manner when moved greater than about 15 microns.

6. The coordinate measuring machine as defined by claim 1 wherein the cross-beam is generally movable in a direction that is orthogonal to the longitudinal axis of the cross-beam.

7. The coordinate measuring machine as defined by claim 6 wherein at least one of the support beams has a second pair of opposing springs to permit movement in the direction that is orthogonal to the longitudinal axis of the cross-beam.

8. The coordinate measuring machine as defined by claim 1 wherein the at least one support beam comprises metal having a beam coefficient of thermal expansion, the base having a base coefficient of thermal expansion that is different from the beam coefficient of thermal expansion.

9. The coordinate measuring machine as defined by claim 8 wherein the base comprises granite and the support beam comprises steel.

10. The coordinate measuring machine as defined by claim 1 wherein the springs form a lazy-S shape.

11. The coordinate measuring machine as defined by claim 1 further comprising a probe arm movably coupled with the cross-beam.

12. The coordinate measuring machine as defined by claim 1 further comprising a track secured to the cross-beam, the cross-beam having at least one pair of springs, each pair of springs having a first spring on one side of the track and a second spring on the other side of the track.

13. The coordinate measuring machine as defined by claim 12 further comprising a first and second fasteners extending from the track and into a securing region of the cross-beam, a given spring pair coupling the securing region to the rest of the cross-beam.

14. A coordinate measuring machine comprising:
at least two support beams, each beam having a rigid member at an end and an offset riser at another end, the rigid member and offset riser in physical contact therewith;
a cross-beam supported on a first end of the support beam, the cross-beam having a longitudinal axis; and
a base supporting the second end of the support beam,
wherein the riser being adapted to elastically bend in the direction of the longitudinal axis.

15. A coordinate measuring machine comprising:
at least one support beam having a top end and a bottom end;
a cross-beam supported on the top end of the at least one support beam, the cross-beam having a longitudinal axis;
a base supporting the bottom ends of the at least one beam; and
a track secured to the cross-beam, the track having a longitudinal axis that is generally parallel with the longitudinal axis of the cross-beam,
the cross-beam having a main body, a plurality of securing regions for securing the track to the cross-beam, and at least one pair of springs, the pair of springs connecting one of the securing regions to the main body.

16. The coordinate measuring machine as defined by claim 15 wherein the springs, main body, and securing region form a cut-out in the cross-beam.

17. The coordinate measuring machine as defined by claim 15 further comprising a plurality of spring pairs, each spring pair connecting its securing region to the main body.

18. The coordinate measuring machine as defined by claim 15 further comprising a plurality of fasteners, each of the plurality of fasteners extending from the track and into one of the securing regions.

19. The coordinate measuring machine as defined by claim 18 wherein one of the securing regions is integral with and directly connected with the main body to form an anchor.

20. A method of calibrating a coordinate measuring machine, the coordinate measuring machine having an anchor beam having a top end and a bottom end, at least one support beam having a top end and a bottom end, a cross-beam supported on the top ends of the anchor beam and the at least one support beam, the cross-beam having a longitudinal axis, and a base supporting the bottom ends of the anchor beam and the at least one support beam, where at least one of the at least one support beams having a first spring and a second spring, the first spring being spaced from the second spring in a direction that is generally parallel with the longitudinal axis of the cross-beam, the method comprising:
during rest, measuring (i) a spatial offset by a linear encoder oriented along the direction that is generally parallel with the longitudinal axis of the cross-beam;
during rest, determining a difference in expansion or contraction between the platform and cross-beam;
storing the spatial offset and difference data in a parameter map; and
applying the parameter map during measurement of an object being measured by the coordinate measuring machine.

21. The method according to claim 20, wherein the difference in expansion and contraction is determined based on temperature.

22. A coordinate measuring machine comprising:
a support structure having a top and bottom portions, the top and bottom portions being disposed to each other and are adapted to frictionally slide therebetween;
the support structure having a first spring and a second spring, each spring spaced apart from the other spring and is affixed to the top portion and the bottom portion in a manner that allows movement in a single direction.

* * * * *